(12) United States Patent
Brownell et al.

(10) Patent No.: US 6,505,502 B1
(45) Date of Patent: Jan. 14, 2003

(54) METHOD AND APPARATUS FOR DETERMINING THE EFFICIENCY OF AN AIR PRECONDITIONING MODULE

(75) Inventors: Kyle A. Brownell, Schofield, WI (US); Chris B. Check, Wausau, WI (US)

(73) Assignee: Greenheck Fan Corp., Schofield, WI (US)

( * ) Notice: Subject to any disclaimer, the term of this patent is extended or adjusted under 35 U.S.C. 154(b) by 0 days.

(21) Appl. No.: 10/002,825

(22) Filed: Nov. 1, 2001

(51) Int. Cl.[7] .............................................. G01M 3/02
(52) U.S. Cl. ......................................................... 73/37
(58) Field of Search .................. 73/37, 865.9; 374/135, 374/143; 165/8

(56) References Cited

U.S. PATENT DOCUMENTS

| | | | | |
|---|---|---|---|---|
| 3,733,791 A | * | 5/1973 | Dravnieks | 55/390 |
| 4,235,608 A | * | 11/1980 | Watanabe et al. | 55/181 |
| 5,035,052 A | * | 7/1991 | Suzuki et al. | 29/890.046 |
| 5,050,092 A | * | 9/1991 | Perry | 364/506 |
| 5,215,704 A | * | 6/1993 | Hirota | 376/245 |
| 5,255,977 A | * | 10/1993 | Eimer et al. | 374/41 |
| 5,353,653 A | * | 10/1994 | Watanabe et al. | 73/865.9 |
| 5,399,017 A | * | 3/1995 | Droege | 374/7 |
| 5,513,519 A | * | 5/1996 | Cauger et al. | 73/112 |
| 6,086,828 A | * | 7/2000 | Thompson | 422/173 |
| 6,209,622 B1 | * | 4/2001 | Lagace et al. | 165/8 |
| 6,439,061 B1 | * | 8/2002 | Nelson et al. | 73/861.65 |

* cited by examiner

Primary Examiner—Hezron Williams
Assistant Examiner—Charles D Garber
(74) Attorney, Agent, or Firm—Quarles & Brady LLP

(57) ABSTRACT

A method and apparatus is provided for determining the efficiency of an air preconditioning module having an energy transfer matrix disposed between a supply air flow to a building, and a return air flow from the building. In particular, a predetermined relationship is determined between pressure drop across measured across the matrix and the efficiency of the matrix.

36 Claims, 4 Drawing Sheets

$(x, y, \eta)$

METHOD AND APPARATUS FOR DETERMINING THE EFFICIENCY OF AN AIR PRECONDITIONING MODULE

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

The present invention relates to air preconditioning modules used in combination with HVAC systems and, in particular, relates to a method and apparatus for determining the efficiency of an air preconditioning module.

Historically, commercial buildings were constructed so as to receive large amounts of air from the ambient environment to enable a continuous supply of fresh air into the building. However, during the energy crisis of the 1970's, buildings were constructed to be more airtight to conserve energy costs associated with heating and cooling large amounts of air. For instance, many HVAC systems only processed a small percentage of outdoor air (e.g. 15%), with the majority of air being re-circulated. This caused germs to permeate throughout the building, causing widespread illness, and resulting in what is now known as "sick building syndrome."

In an effort to prevent future sick buildings, heating, ventilating and air-conditioning (HVAC) standards were enacted by the industry's trade organization, the American Society of Heating Refrigeration and Air-Conditioning Engineers (ASHRAE). In particular, ASHRAE standards increased the amount of outdoor air recommended for commercial type buildings to ensure that adequate amounts of fresh air were supplied to commercial buildings. Prior to the development of reliable air preconditioning modules, the industry had been reluctant to comply with these standards due to the costs associated with conditioning large amounts of outdoor air.

Conventional air preconditioning modules are disposed between the inlet to the outdoor air and the building's HVAC system. In operation, they receive the outdoor air that is to be supplied to the building, and also receive return air that has been circulated throughout the building, and that is to be exhausted into the outdoor environment. The modules typically include an energy recovery wheel that transfers energy between the exhaust air and the supply air, thereby achieving the goals of 1) reducing costs associated with conditioning the supply air that is circulated within the building, while 2) ensuring that enough fresh air is circulated to prevent sick building syndrome. Because air preconditioning modules are valuable to the user only insofar as they increase the efficiency of the HVAC system, it is desirable to enable the end user to quantify the cost savings of installing such modules.

Traditional methods of determining the efficiency of air preconditioning modules included installing thermocouples (to measure dry and wet-bulb) in the supply inlet, supply outlet and exhaust inlet of the module. The outputs from these modules could be manually read or fed into a PLC to calculate the efficiency of the energy wheel. On a 75% efficient (total, sensible and latent) wheel, this method can determine sensible efficiencies within ±7% of the actual value, latent efficiencies within ±14% and total efficiencies within ±8% during extreme operating conditions such as 95° F. dry-bulb/78° F. wet-bulb supply inlet air and 75° F. dry-bulb/63° F. wet-bulb exhaust inlet air. At typical operating conditions such as 82° F. dry-bulb/69° F. wet-bulb supply inlet air and 75° F. dry-bulb/63° F. wet-bulb exhaust inlet air, the sensible efficiencies can be determined within ±19%, the latent efficiencies within ±35% and the total efficiencies within ±21% of the actual value.

All of the above examples assume the user is using standard dry-bulb and wet-bulb temperature sensing means with ±1° F. accuracy in their measurements. In addition to being inaccurate, such a method is labor intensive, and may not provide the user with real-time efficiency information.

BRIEF SUMMARY OF THE INVENTION

The present invention provides a method and apparatus for measuring the efficiency of an air preconditioning module. More particularly, the method includes (a) feeding a supply air stream and return air stream through the matrix, (b) measuring a pressure differential across the matrix in the supply air stream or return air stream, and (c) producing an efficiency value for the matrix based on a pre-established relationship between the measured pressure differential across the matrix and the efficiency of the matrix.

In one aspect, the efficiency may be provided based on the pressure differential of only one of the supply air stream and return air stream when the streams are substantially balanced. In another aspect, the efficiency may be provided based on the pressure differential of both the supply air stream and return air stream when the two streams are unbalanced.

The foregoing and other aspects of the invention will appear from the following description. In the description, reference is made to the accompanying drawings, which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 1:
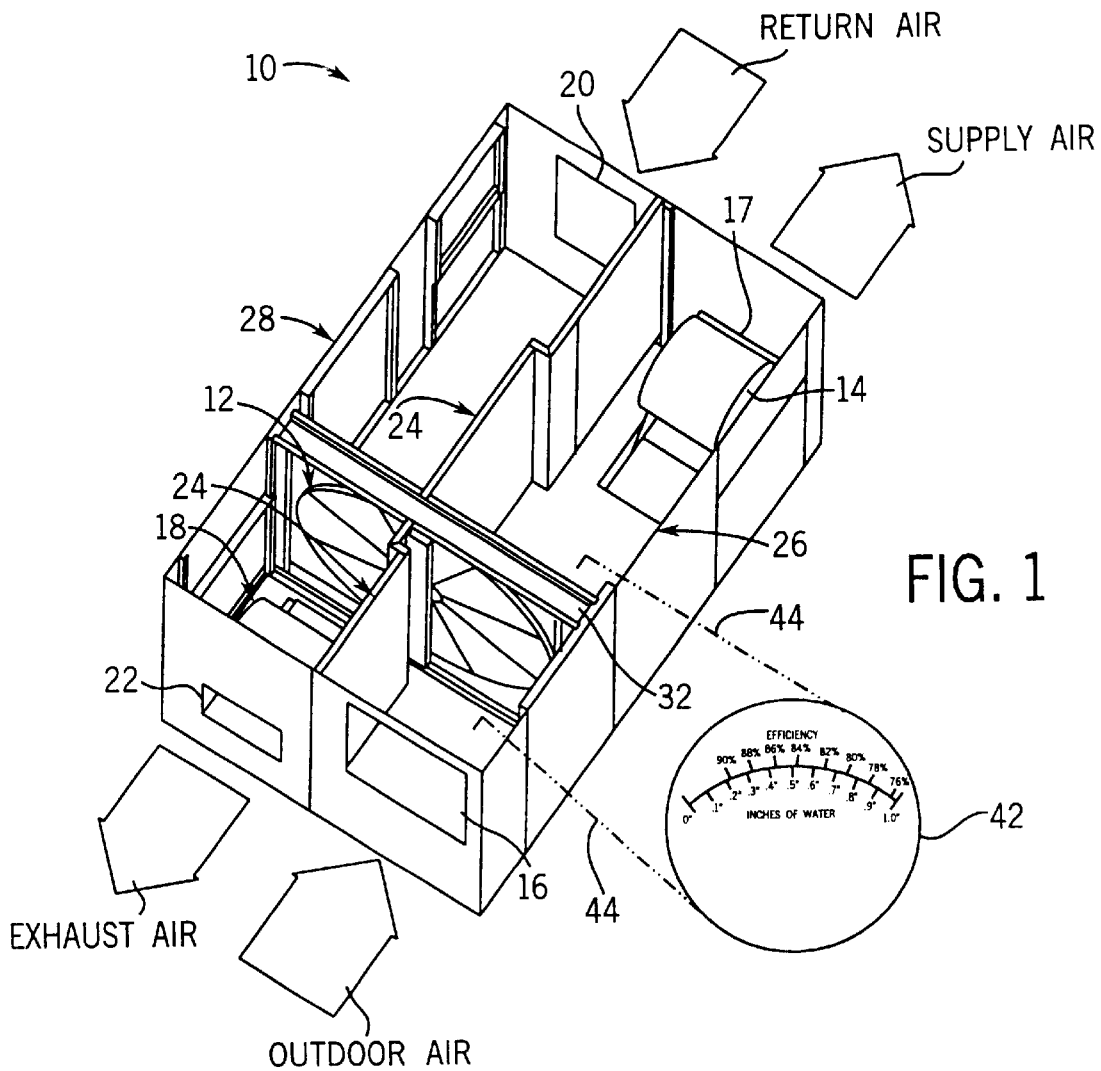
FIG. 1 is a perspective view of an air preconditioning module constructed in accordance with the preferred embodiment of the invention having pressure tubes inserted into the outdoor and supply air streams and connected to an efficiency meter to calculate the efficiency of the module in accordance with one embodiment of the invention.

Referring initially to FIG. 1, an air preconditioning module 10 is used to precondition air that travels to a packaged HVAC unit (not shown) of a building. The module may be configured for installation in a commercial or residential building. In particular, module 10 receives outdoor air, preconditions the air, and forwards the supply air to the HVAC unit. The HVAC conditions the supply air, and circulates the air throughout conditioned space of the building. The air is subsequently returned to module 10 as return air, and expelled into the outdoors as exhaust air. The air preconditioning module 10 includes any conventional energy exchange apparatus, such as a rotary energy recovery wheel 12. While air preconditioning module 10 is illustrated as being a stand-alone unit, it should be appreciated that module 10 could alternatively be integrated into an HVAC unit to provide a single module that preconditions the air, and further heats and/or cools the air that is supplied to the building.

As will be described in more detail below, the return air and supply air pass through the wheel 12, the wheel transfers energy from the return air to the supply air, thereby reducing the costs associated with moving large amounts of outdoor air into a building. A skilled artisan will appreciate that a reliable determination of the efficiency of the wheel 12 may be used to calculate the energy savings of the air preconditioning module 10.

Air preconditioning module 10 defines an enclosure having a divider 24 that separates an intake side 26 from an exhaust side 28. The divider is sealed so as to prohibit the leakage of air from one side to the other. Module 10 includes a supply air fan 14, which draws outdoor air through an outdoor air vent 16. The outdoor air travels through wheel 12, and is then forwarded via supply air vent 17 to the HVAC unit. Module 10 further includes an exhaust air fan 18 which draws used air (return air) from the HVAC unit through a return air vent 20 in the exhaust side 28 of the module. The return air passes through wheel 12, and is then expelled through vent 22 to the outdoors.

Figure 4:
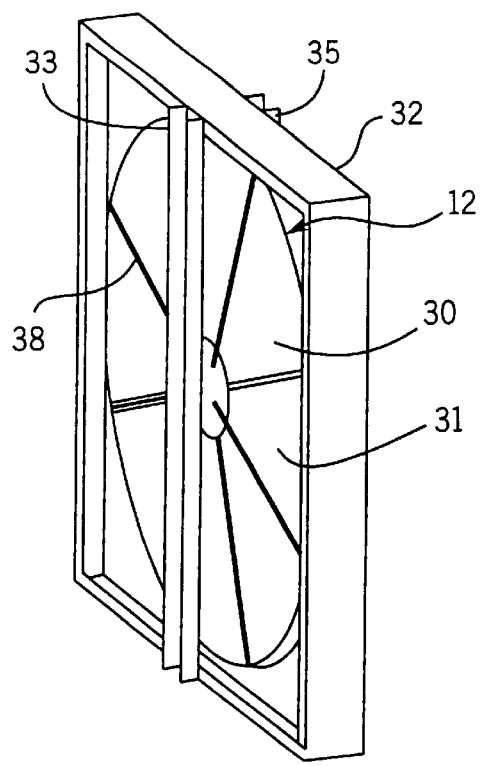
FIG. 4 is a perspective view of an energy wheel constructed in accordance with the preferred embodiment.
Figure 5:
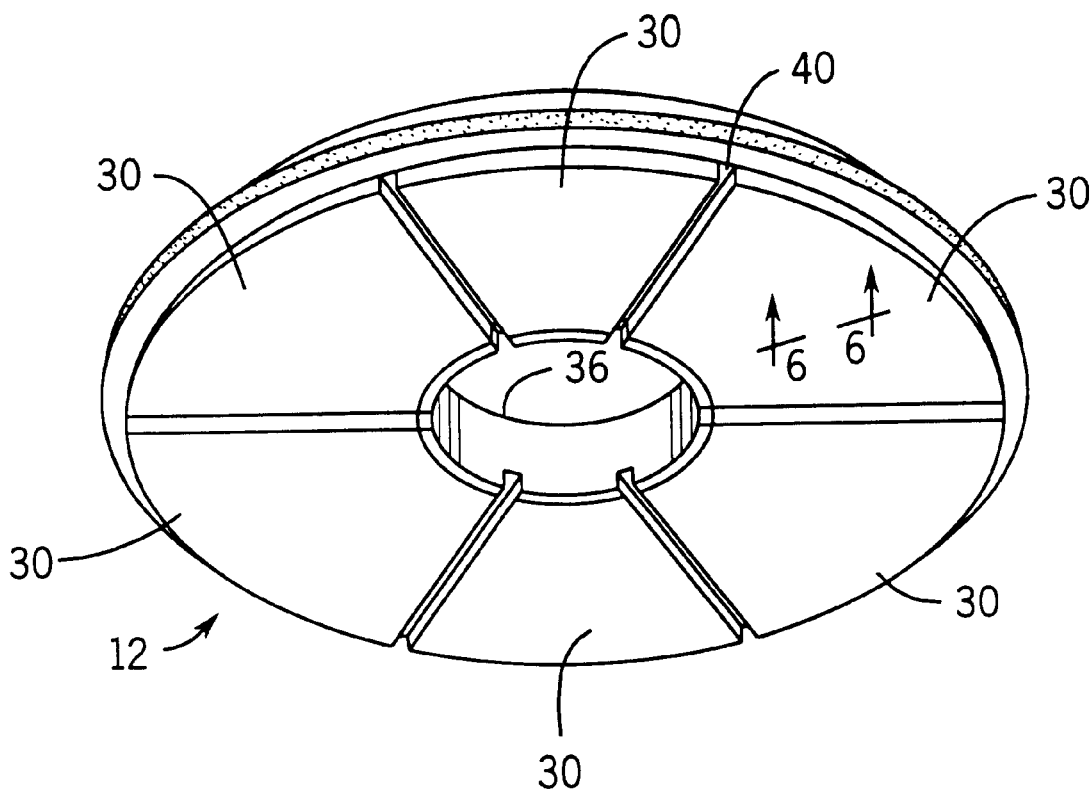
FIG. 5 is a perspective view of the matrix making up the energy wheel in FIG. 4.
Figure 6:
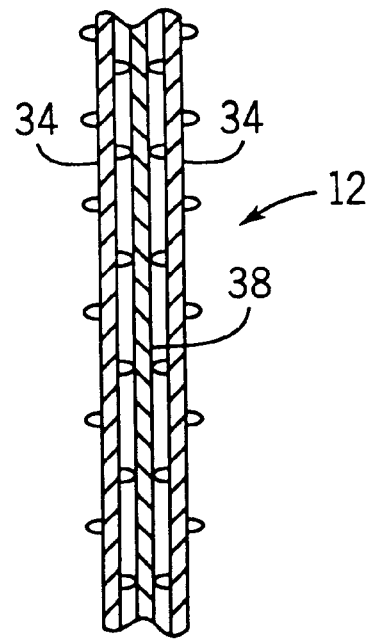
FIG. 6 is a sectional side elevation view of the matrix illustrated in FIG. 5 taken along line 6—6.

Referring now also to FIGS. 4–6, energy recovery wheel 12 is made up of a plurality of segments 30 that comprise a matrix 31 having any suitably desiccant material with sufficient heat capacity to provide an air-to-air sensible (temperature) and/or latent (humidification or dehumidification) energy transfer matrix 31, as is understood by those having ordinary skill in the art. The outdoor air and return air typically flow simultaneously through different segments 30 in opposite directions, while the wheel 12 is rotating, to provide the supply air and exhaust air, respectively.

Wheel 12 has a centrally disposed aperture (not shown) that allows its hub 36 to be mounted onto a drive shaft (not shown) which may be rotated by any suitable means such as by a belt driven pulley (not shown). The matrix 31 is preferably formed of two continuous spiral wound layers of strips formed of plastic of a type which is capable of being heat sealed, such as polystyrene. A first strip 34 has suitable surface projections to provide gas passages between the strip layers, and a second strip 38 is flat without projections and disposed between adjacent strips 34 to create spacing between the projections. Many types of embossments or deformations of strips in spiral wound matrices for such heat exchangers are known in the art. However, it is preferred that the strips and gas passages formed between the strips have dimensions such that the parameter $L^2/(K_s*S*t)$ is greater than about 7 hr-ft-° F./BTU, where L is the width of the strip (i.e., the thickness of the matrix), $K_s$ is the heat conductivity of the material of which the strip is made, S is the spacing between the strips, and t is the thickness of the strip.

A spiral wound matrix wheel should not be wound tightly, since excessive tension during winding will reduce the size of the gas passages and reduce the efficiency of the matrix 31. For this reason, the wheel 12 has little strength, particularly in a direction perpendicular to the plan of the matrix face. Radial arms 38 are thus provided to underlie the assembled matrix 31 to provide support thereto, and preferably have a length at least great enough to reach the outer periphery of the matrix 31. In particular, arms 38 fit within radial grooves 40 that are dimensioned and positioned to allow the radial arms to seat therein flush, such that rotation of the hub and arms is imparted onto the segments 30.

Wheel 12 is rotatably mounted within a frame 32, and has an axially extending axis of rotation. As the wheel 12 rotates, energy from one stream is fed into the other. During winter operation, energy from the exhaust airstream is transferred to the supply airstream. During the summer, energy from the supply airstream is transferred to the exhaust airstream. The preconditioned outdoor air is then supplied to the HVAC unit. As the air preconditioning module 10 operates, up to 85% of the total energy (enthalpy) differential that exists between the outdoor and return air flow is recovered and transferred from one airstream to the other.

To control the air flow through the matrix 31, a seal assembly is provided on each face of the matrix 31. In the illustrated embodiment, the seal assemblies comprise a pair of plates 33 and 35 that extend between the wheel 12 and the upper and lower surfaces of the housing 32 and generally bisect the face of the matrix 31. They also extend laterally between the housing walls so that each half of the matrix 31 is in a separate chamber through which incoming and outgoing air can flow independently of each other. Elongated flexible seals (not shown) are fastened to the edge of the seal plates on each side of the center of the wheel 12 and on opposite sides of the plate so that the flexible seals drag against the surface of the wheel as the wheel rotates.

Examples of such a wheel are described in U.S. Pat. Nos. 4,825,936 and 5,002,116, the disclosures of each of which are hereby incorporated by reference as if set forth in their entirety herein. While wheel 12 is used in accordance with the preferred embodiment, a skilled artisan will appreciate that other energy transfer apparatus could be used, such as a plate type or heat pipe apparatus, other rotary energy transfer devices, or any other suitable energy transfer apparatus having a pressure differential there across so as to enable a pressure-based efficiency calculation, as will be described in more detail below.

In accordance with the preferred embodiment, matrix 31 is operated with a laminar airflow, which causes the air to become uniformly distributed through the matrix, and have an even velocity and pressure profile. Similarly, the matrix 31 preferably uses a laminar return air flow entering the matrix 31 that is evenly distributed, thereby also ensuring an even pressure drop across energy recovery wheel 12 for the return and exhaust air streams. The laminar flow across the matrix 31 enables a linear relationship to be established between the pressure drop across the matrix 31 and efficiency, as will be described in more detail below. It is further preferred that the air flow through the wheel 12 be substantially uniformly distributed so as to enable an accurate pressure drop to be measured across the wheel matrix 31, thus resulting in an accurate efficiency determination. However, as will be described in more detail below, the present invention may be achieved with non-laminar air flows as well.

Figure 3:
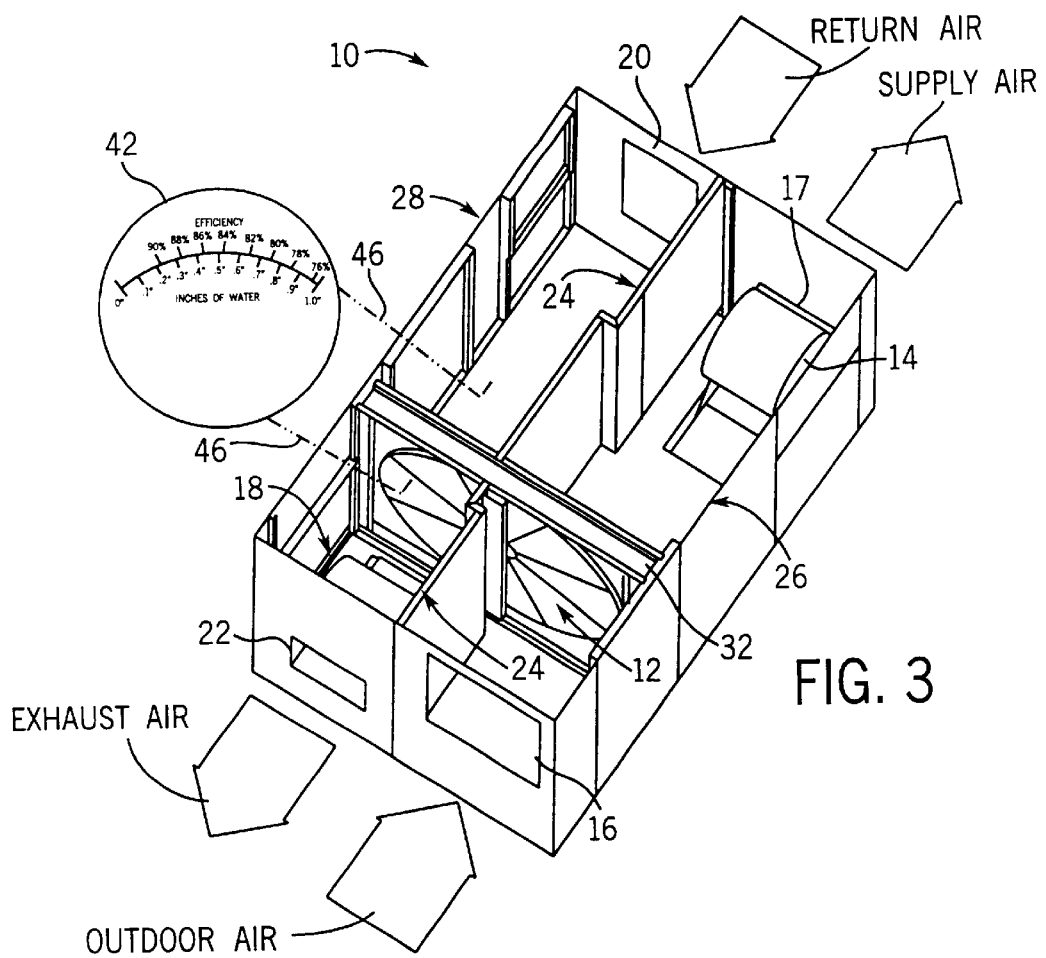
FIG. 3 is a perspective view of an air preconditioning module similar to that of FIG. 1, but having pressure tubes inserted into the return and exhaust air streams to enable efficiency calculation in accordance with another embodiment of the invention.

Referring again to FIG. 1, and also to FIG. 3, to determine the efficiency of the air preconditioning module 10 is determined by first measuring the pressure drop across the intake side 26 (pressure drop between the outdoor and supply air flows) and/or the exhaust side 28 (pressure drop between the return and exhaust air flow). In particular, two sets of pressure tubes 44 and 46 are secured in place in each of the four air streams (i.e. outdoor-supply air and return-exhaust air, respectively). The tubing comprises any suitable plastic or metal material. Preferably, the open end of each pressure tube is secured in the respective air stream such that the pressure reading is taken in the front face of the transfer matrix 31 of wheel 12. The preferred method is for the opening of pressure tubes 44 and 46 to be pointed perpendicular to and away from the direction of the air flow to enable an accurate static pressure reading. Alternatively, the tubes could face directly upstream into the direction of airflow to enable a total pressure reading.

Because of the uniform distribution of the air stream exiting from the wheel 12, the pressure measurements may be taken anywhere in the air streams within module 12. A discovery of the present invention is that the operational efficiency of the energy recovery wheel 12 changes in direct proportion with the pressure drop across the wheel 12. This is true regardless of whether or not the air flow is balanced between the intake side 26 and exhaust side 28 of the module 10 (though different relationships are established depending on whether a balanced flow is obtained). Preferably, however, the tubes are not positioned near the seals of divider 24, as the pressure in this area occasionally reflects a pressure value representing an average of the two air streams flowing through the wheel 12 rather than the desired air stream exiting or entering the wheel. The distal ends of the pressure tubes 44 and 46 are connected to a conventional meter 42 to measure the pressure drop of the air flowing through wheel 12.

Meter 42 further includes a scale that correlates pressure drop and efficiency based on the predetermined relationship established between the two values for a given wheel, as will be described in more detail below. Meter 42 therefore provides an output indicating the efficiency of the wheel 12 during operation. If the pressure drop across the wheel 12 at the intake side 26 and outlet side 28 are substantially similar, i.e. within 10% of each other, then a reading from only one of the two meters need be taken and, in fact, only one set of pressure tubes 44 or 46 would be needed to obtain an accurate efficiency determination. If the flows are substantially unbalanced (i.e. greater than 10% different), two pressure gauges may be used in combination to provide the necessary input usable to determine the efficiency.

In particular, it has been determined that the efficiency of an energy recovery wheel 12 is related to the flow characteristics of the air passing therethrough. In situations where the pressure drops (and therefore the airflows) are balanced, the efficiency of the wheel 12 may be determined by the following equation:

$$\eta = \frac{(X_{si} - X_{xo})}{(X_{si} - X_{ei})} * 100 \tag{1}$$

η a is the operating efficiency of energy wheel 12;
$X_{si}$ is the temperature, enthalpy, or humidity ratio at the inlet of the wheel 12 at the intake side 26;
$X_{xo}$ is the temperature, enthalpy, or humidity ratio at the outlet of the wheel 12 at the intake side 26; and
$X_{ei}$ is the temperature, enthalpy or humidity ratio at the exhaust inlet of the exchanger.

Various efficiency values of the wheel may be calculated by the manufacturer in a controlled lab environment for various mass flow rates, using conventional methods, such as testing the wheel 12 in accordance with the test procedures outlined in Air-Conditioning and Refrigeration Institute (ARI) standard 1060. The temperature, enthalpy, and/or humidity ratios are used in accordance with sensible and/or latent energy transfer systems, as understood by one having ordinary skill in the art. The various efficiency values may be plotted as a function of pressure drop to establish a linear relationship between efficiency and pressure drop for the energy wheel 12 that was tested. This linear relationship is established because of the laminar flow regime, which causes linear changes in pressure drop and efficiency through the useful performance range of the energy wheel 12. Using the empirical data obtained in Equation 1 for the wheel tested and matching it with the pressure drop recorded at the various test conditions, the pressure drop across the wheel 12 at either the intake side 26 or the exhaust side 28 (assuming the two are similar) was related to efficiency as indicated in Equation 2:

$$\eta = -.18537 * \Delta P + 0.94 \tag{2}$$

Where ΔP is the pressure drop across the wheel 12 at either the inlet side 26 or exhaust side 28.

Figure 2:
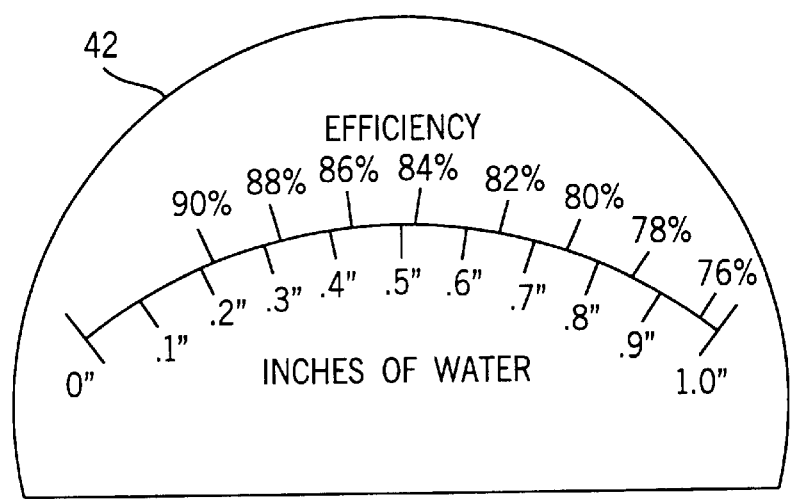
FIG. 2 illustrates an efficiency gauge constructed in accordance with one embodiment of the present invention.
Figure 7:
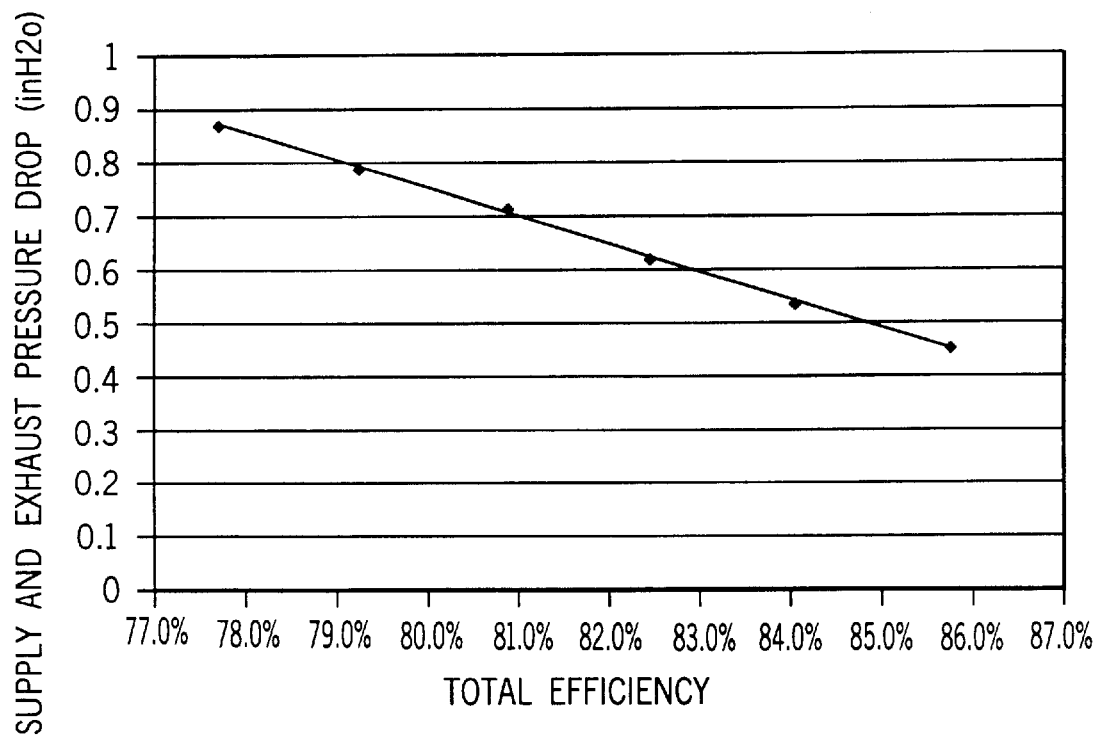
FIG. 7 is graph plotting efficiency vs. pressure drop in accordance with one embodiment of the invention.

The results of this linear relationship appear below in Table 1, and are plotted in FIG. 7. Therefore, for the wheel tested in the example above, an end user may use the efficiency meter 42 illustrated in FIG. 2 to indicate the efficiency of the recovery wheel 12 (and thus the air preconditioning module 10) based on the measured pressure drop across the wheel 12 during operation. While the slope and constant of Equation (2) may vary from one wheel 12 to the next, a linear relationship will nonetheless be established and provided by the manufacturer. The scale of the meter 42 would be adjusted to accurately correlate pressure drop with efficiency, thereby providing automated, real-time data to the end user.

It should also be understood a skilled artisan that the principles of the present invention further apply to an air preconditioning module having non-laminar return and supply flows. In particular, Equation 1 is equally applicable to determine the efficiency of the matrix 31 when a transition flow or turbulent flow exists. Accordingly, an end user would order the preconditioning module 10 having a desired mass flow rate that had a reasonable pressure drop across the matrix (typically the highest pressure drop is 1 inch $H_2O$ but higher or lower pressure drops are also acceptable). Typically, in a solidly engineered product, the lower the pressure drop, the higher the efficiency of the matrix 31. However, lower pressure drops correlate to larger matrix sizes or lower airflows or a combination thereof, thereby increasing the initial purchase cost per cfm for the matrix 31. The exact operating pressure drop and thereby efficiency of the matrix 31 is established once the unit is installed in the field. Once installed, the user is thus provided with a meter 42 having a scale that properly correlates efficiency to pressure drop based on empirical data obtained in a controlled laboratory environment based on the flow characteristics specified by the end user, regardless of whether a laminar, transition, or turbulent flow is produced across the matrix 31.

TABLE 1

| ΔP | η |
|---|---|
| 0.45 | 85.7% |
| 0.53 | 84.1% |
| 0.62 | 82.5% |
| 0.71 | 80.9% |
| 0.79 | 79.3% |
| 0.88 | 77.7% |

The present invention further provides a mechanism for determining the efficiency of the wheel 12 when an unbalanced pressure drop exists across the wheel between the intake side 26 and outlet side 28. In particular, the present invention relies on empirical data to establish a relationship between the following Equation 3 and efficiency as a function of pressure drop.

$$\eta = \frac{m_{so}(X_{si} - X_{xo})}{m_{min}(X_{si} - X_{ei})} * 100 \quad (3)$$

where $m_{so}$ is the mass flow of air through the supply out section of preconditioning module 10;

$m_{min}$ is the lesser of the mass flow of air between 1) the outlet of the wheel at the intake side 26, and 2) the inlet of the wheel at the exhaust side 28;

As described above, the manufacturer may empirically determine efficiency values for the wheel 12 corresponding to varying airflows on the supply and exhaust side of the wheel. At each of these airflows, the pressure drop is measured and the resulting efficiency is obtained. Through extensive experimentation, these values have been found to be related in a substantially linear fashion (in the useful operating range of the wheel 12) when holding one of the airflows constant. Equation 4 depicts one of several analytical methods for determining the sensible efficiency of an energy wheel operated at balanced airflows. Providing a simplified linear relationship between the efficiency and airflow only leaves the linear relationship between the pressure drop and the airflow to be determined. Equation 5 provides a known equation which analytically demonstrates the linear relationship between pressure drop and airflow between parallel plates.

$$\eta_{analytical, balanced} = \frac{1}{1 + m * Cp/(Ut * A)} \quad (4)$$

$$\Delta P = \frac{32 \, \mu * L * V}{d^2} \rightarrow \Delta P \propto V \quad (5)$$

From equation 4, it is apparent to one skilled in the art that with balanced airflows, the analytical efficiency of the energy wheel 12 is directly proportional to the change in airflow in the useful operating regime of the wheel. In equation 5 it is demonstrated that given a constant geometry of the wheel 12 and constant properties of the air, the pressure drop changes in a linear form with the change in velocity across the wheel.

Figure 8:
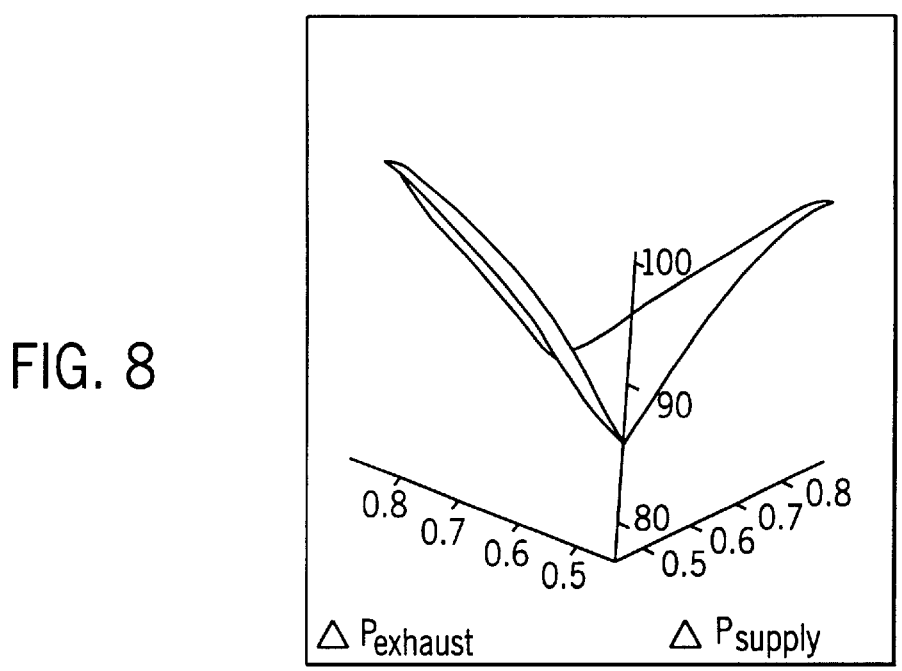
FIG. 8 is a graph plotting efficiency vs. pressure drop in accordance with an alternate embodiment of the invention.

One example of efficiency values for a wheel determined as a function of the pressure drop at the supply side 26 and the exhaust side 28 is illustrated below in Table 2. The results are plotted in FIG. 8.

TABLE 2

| | Supply (ΔP) | | | | | |
|---|---|---|---|---|---|---|
| Exhaust (ΔP) | 0.45 | 0.53 | 0.62 | 0.71 | 0.79 | 0.88 |
| 0.45 | 85.7% | 90.8% | 94.5% | 97.3% | 99.1% | 100.3% |
| 0.53 | 89.9% | 84.1% | 88.4% | 91.5% | 94.0% | 96.0% |
| 0.62 | 92.9% | 87.6% | 82.5% | 86.1% | 88.9% | 91.1% |
| 0.71 | 95.2% | 90.2% | 85.5% | 80.9% | 84.0% | 86.4% |
| 0.79 | 96.5% | 92.3% | 87.8% | 83.5% | 79.3% | 82.0% |
| 0.88 | 97.3% | 93.9% | 89.7% | 85.5% | 81.5% | 77.7% |

The user may thus read the pressure drop from meters 42, correlate the values to table 2, and interpolate (if necessary) to determine the efficiency of the preconditioning module 10. Alternatively, the measurement tubes 44 and 46 may be connected to a pressure transducer to convert the measured pressure drop to an electronic signal (either periodically or real-time) which is sent to a central control module that produces an efficiency output signal corresponding to the measured pressure drops.

This method may also be used to determine pressure drops in accordance with the method described above with respect to Equations (1) and (2). The control may be connected to a display located remotely from the preconditioning module 10.

It should also be understood, as described above, that the principles of the present invention further apply to an air preconditioning module having unbalanced non-laminar return and supply flows using Equation 3 for a given set of user preferences.

Advantageously, the present invention thus establishes a method for transmitting real-time operating efficiency values obtained in accordance with the preferred embodiment to a user stationed remotely from the air preconditioning module 10. Furthermore, because the invention relies on accurate test results obtained from a controlled lab environment to correlate the energy wheel 12 pressure drop to efficiency, and because pressure drop is a more reliably obtained value than temperature and humidity during operation, the efficiency values obtained in accordance with the present invention are more reliable than conventional in-situ methods of measuring efficiency. The current methods often use thermocouples or RTD's for determining a sensible only efficiency which can have very poor measurement accuracy's.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

I claim:

1. A method for determining the efficiency of an air preconditioning module of the type having a supply air stream and a return air stream that flow through an energy transfer matrix, the steps comprising:

(a) feeding the supply air stream and return air stream through the matrix;

(b) measuring a pressure differential across the matrix in one of the supply air stream and return air stream; and (c) producing an efficiency value for the matrix based on a pre-established relationship between the measured pressure differential across the matrix and the efficiency of the matrix.

2. The method as recited in claim 1, further comprising the steps of:
   (d) measuring a second pressure differential across the other of the supply air stream and return air stream; and
   (e) determining that the pressure differentials measured in steps (b) and (d) are substantially similar.

3. The method as recited in claim 1, wherein the air preconditioning module is installed in a building, and wherein the predetermined relationship between the efficiency and pressure drop is determined prior to the installation.

4. The method as recited in claim 1, wherein step (b) further comprises placing distal ends of first and second tubing members into an inlet side and outlet side of the matrix, and connecting ends opposite the distal ends to a device for determining the pressure differential between the distal ends.

5. The method as recited in claim 4, wherein the device comprises a pressure gauge having 1) a scale that correlates various potential pressure differentials to corresponding pressure values based on the predetermined relationship, and 2) an indicator for identifying the determined pressure differential.

6. The method as recited in claim 4, wherein the device is a pressure transducer, the steps further comprising transmitting electrical signals corresponding to the pressure differential to a controller and processing the electrical signals to determine the efficiency.

7. The method as recited in claim 1, further comprising outputting the determined efficiency to a user stationed remotely from the air preconditioning module.

8. The method as recited in claim 1, further comprising repeating step (c) continuously while the air preconditioning module is in operation.

9. The method as recited in claim 1, wherein the supply air stream and return air stream are substantially laminar.

10. The method as recited in claim 9, wherein the predetermined relationship between pressure differential and efficiency is substantially linear.

11. The method as recited in claim 1, further comprising rotating the matrix to deliver energy received from the return air flow to the supply air flow.

12. The method as recited in claim 1, further comprising the step of determining energy savings of the air preconditioning module based on the efficiency determined in step (c).

13. The method as recited in claim 1, wherein the predetermined relationship between pressure differential and efficiency is based on empirical data from data collected and used in the following equation which may be correlated with pressure drop at a given test point:

$$\eta = \frac{m_{so}(X_{si} - X_{xo})}{m_{min}(X_{si} - X_{ei})} * 100 \text{ where}$$

$\eta$ is the efficiency of the matrix;
$m_{so}$ is the mass flow of supply air stream output from the matrix;
$m_{min}$ is the lesser of the mass flow of air between 1) the supply air stream output from the matrix and 2) the return air stream input to the matrix;
$X_{si}$ is one of the temperature, enthalpy, and humidity ratio of the supply air at the inlet of the matrix;
$X_{xo}$ is one of the temperature, enthalpy, and humidity ratio of the supply air at the outlet of the matrix; and $X_{ei}$ is the temperature, enthalpy or humidity ratio of the return air at the inlet of the matrix.

14. The method as recited in claim 1, wherein the supply air stream and return air stream are non-laminar.

15. A method for determining the efficiency of an air preconditioning module of the type having a supply air stream and a return air stream that flow through an energy transfer matrix, the steps comprising:
   (a) feeding the supply air stream and return air stream through the matrix;
   (b) measuring a first pressure differential across the matrix in the supply air stream;
   (c) measuring a second pressure differential across the matrix in the return air stream; and
   (d) determining an efficiency value for the matrix based on a predetermined relationship between the efficiency of the matrix and the first and second pressure differentials across the matrix of the air preconditioning module.

16. The method as recited in claim 15, further comprising the step of determining that the first and second pressure differentials are substantially different.

17. The method as recited in claim 15, wherein the air preconditioning module is installed in a building, and wherein the predetermined relationship between the efficiency and pressure drop is determined prior to the installation.

18. The method as recited in claim 15, wherein step (b) further comprises placing distal ends of a first pair of tubing members into an inlet side and outlet side of the matrix, respectively, in the supply air stream.

19. The method as recited in claim 18, wherein step (c) further comprises placing distal ends of a second pair of tubing members into an inlet side and outlet side of the matrix, respectively, in the return air stream.

20. The method as recited in claim 19, further comprising the steps of:
   connecting the ends opposite the distal ends of the first pair of tubing to a first pressure gauge to determine the first pressure differential; and
   connecting the ends opposite the distal ends of the second pair of tubing to a second pressure gage to determine the second pressure differential.

21. The method as recited in claim 19, further comprising the steps of:
   connecting ends opposite the distal ends of the first and second pairs of tubing members into a pressure transducer;
   transmitting electrical signals corresponding to the pressure differential to a controller; and
   processing the electrical signals to determine the efficiency.

22. The method as recited in claim 15, further comprising outputting the determined efficiency to a user stationed remotely from the air preconditioning module.

23. The method as recited in claim 15, further comprising repeating step (d) continuously while the air preconditioning module is in operation.

24. The method as recited in claim 15, further comprising rotating the matrix to deliver energy received from the return air flow to the supply air flow.

25. The method as recited in claim 15, further comprising the step of determining energy savings of the air preconditioning module based on the efficiency determined in step (d).

26. The method as recited in claim 15, wherein the supply air stream and return air stream are non-laminar.

27. In an air preconditioning module of the type having a supply air stream that is fed into a building, and a return air stream received from the building, and wherein the streams flow into an energy transfer matrix that transfers energy from the return air stream to the supply air stream, the improvement comprising:

first pressure measuring means operable to measure a first pressure differential across the matrix in one of the return air stream and the supply air stream; and an efficiency indicator connected to the first pressure measuring means and being operable in response to the measured pressure differential and a predetermined relationship between pressure differential and efficiency for the energy transfer matrix to indicate efficiency of the energy transfer matrix during operation.

28. The apparatus as recited in claim 27, wherein the pressure differential across the matrix in the supply air stream is substantially similar to the pressure differential across the matrix in the return air stream.

29. The apparatus as recited in claim 27, further comprising means for processing the supply air stream and return air stream so that the streams exiting the matrix are uniformly distributed and substantially laminar.

30. The apparatus as recited in claim 29, wherein the predetermined relationship is substantially linear.

31. The apparatus as recited in claim 27, further comprising output means operable to display the efficiency to a user stationed remotely from the preconditioning module.

32. The apparatus as recited in claim 27, further comprising a second pressure measuring means operable to measure a second pressure differential across the matrix in the other of the return and supply air streams.

33. The apparatus as recited in claim 32, wherein the efficiency indicator is further responsive to the second pressure measuring means.

34. The apparatus as recited in claim 32, wherein the first and second pressure differentials are not substantially similar to one another.

35. The apparatus as recited in claim 32, wherein the predetermined relationship between the pressure differential and efficiency is nonlinear.

36. The apparatus as recited in claim 27, wherein the supply air stream and return air stream are non-laminar.

* * * * *